(12) United States Patent
Kotzur

(10) Patent No.: US 8,057,334 B2
(45) Date of Patent: Nov. 15, 2011

(54) ACCESSORY DRIVE TENSIONER ASSEMBLY

(75) Inventor: Scott W. Kotzur, Carmel, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 272 days.

(21) Appl. No.: 12/565,493

(22) Filed: Sep. 23, 2009

(65) Prior Publication Data

US 2011/0070984 A1    Mar. 24, 2011

(51) Int. Cl.
*F16H 7/12* (2006.01)
*B60K 6/20* (2007.10)

(52) U.S. Cl. .................................... 474/133; 180/65.21

(58) Field of Classification Search .............. 184/109, 184/131, 133, 134, 135, 136, 137, 138; 474/94
See application file for complete search history.

(56) References Cited

U.S. PATENT DOCUMENTS

| | | | | |
|---|---|---|---|---|
| 4,046,022 A * | 9/1977 | Henderson | .............. | 476/17 |
| 4,571,223 A * | 2/1986 | Molloy | .............. | 474/133 |
| 4,917,654 A * | 4/1990 | Edwards | .............. | 474/133 |
| 5,176,580 A * | 1/1993 | Stamm et al. | .............. | 474/101 |
| 5,277,666 A * | 1/1994 | Kumm | .............. | 474/133 |
| 5,439,420 A * | 8/1995 | Meckstroth et al. | .............. | 474/133 |
| 6,162,141 A * | 12/2000 | Rointru et al. | .............. | 474/109 |
| 6,896,632 B2 * | 5/2005 | Redmond | .............. | 474/133 |
| 7,147,099 B2 * | 12/2006 | Guernsey et al. | .............. | 198/834 |
| 7,163,478 B2 * | 1/2007 | Oliver et al. | .............. | 474/133 |
| 7,479,078 B2 * | 1/2009 | Joslyn | .............. | 474/133 |
| 7,494,434 B2 * | 2/2009 | Mc Vicar et al. | .............. | 474/109 |
| 7,530,911 B2 * | 5/2009 | Serkh | .............. | 474/134 |
| 7,883,436 B2 * | 2/2011 | Mosser et al. | .............. | 474/135 |
| 7,901,310 B2 * | 3/2011 | Lolli et al. | .............. | 474/134 |

* cited by examiner

*Primary Examiner* — William E Dondero
*Assistant Examiner* — Mark K Buse
(74) *Attorney, Agent, or Firm* — Harness, Dickey & Pierce, P.L.C.

(57) ABSTRACT

An accessory drive tensioner assembly may include a bracket assembly, a fastener and a tensioner hub. The bracket assembly may include first and second bearings axially spaced from one another. The fastener may extend through the first and second bearings to rotationally couple the bracket assembly to an engine structure and may define a rotational axis for the bracket assembly. The tensioner hub may be coupled to the bracket assembly and may be located axially between the first and second bearings.

20 Claims, 5 Drawing Sheets

ACCESSORY DRIVE TENSIONER ASSEMBLY

FIELD

The present disclosure relates to internal combustion engines, and more specifically to accessory drive tensioner systems for internal combustion engines.

BACKGROUND

This section provides background information related to the present disclosure which is not necessarily prior art.

Engine assemblies may include belt tensioning mechanisms to maintain tension on a belt engaged with rotationally driven engine components. During operation, the load on the belt may vary based on drive requirements of the rotationally driven components. The tensioning mechanism may include a tensioner arm having a first end rotationally coupled to a bracket and a second end having a tensioner hub coupled thereto. The bracket may include a bearing rotationally supporting the bracket relative to an engine structure. The tensioner arm may be rotationally biased to displace the tensioner hub toward the bearing during operation. However, the bearing may be in the same plane as the tensioner hub and belt and may limit travel of the tensioner hub.

SUMMARY

An accessory drive tensioner assembly may include a bracket assembly, a fastener and a tensioner hub. The bracket assembly may include first and second bearings axially spaced from one another. The fastener may extend through the first and second bearings to rotationally couple the bracket assembly to an engine structure and may define a rotational axis for the bracket assembly. The tensioner hub may be coupled to the bracket assembly and may be located axially between the first and second bearings.

In another arrangement, an accessory drive tensioner assembly may include a bracket assembly, a fastener, a tensioner arm and a tensioner hub. The bracket assembly may include first and second bearings axially spaced from one another. The fastener may extend through the first and second bearings to rotationally couple the bracket assembly to an engine structure and may define a rotational axis for the bracket assembly. The tensioner arm may have a first end rotationally coupled to the bracket assembly. The tensioner hub may be coupled to a second end of the tensioner arm and may be located axially between the first and second bearings. The tensioner arm may be adapted to locate a drive belt engaged with the tensioner hub radially within an outer perimeter of the first bearing when the tensioner arm is displaced from a first position to a second position.

An engine assembly may include an engine structure, a first rotational drive member having a first drive hub rotationally fixed thereto, a second rotational drive member having a second drive hub rotationally fixed thereto, and a tensioner assembly. The tensioner assembly may include a bracket assembly, a fastener, a tensioner hub and a drive belt. The bracket assembly may include first and second bearings axially spaced from one another. The fastener may extend through the first and second bearings and rotationally couple the bracket assembly to the engine structure. The tensioner hub may be coupled to the bracket assembly and may be located axially between the first and second bearings. The drive belt may be engaged with the first and second drive hubs and the tensioner hub to transfer rotation between the first and second rotational drive members.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
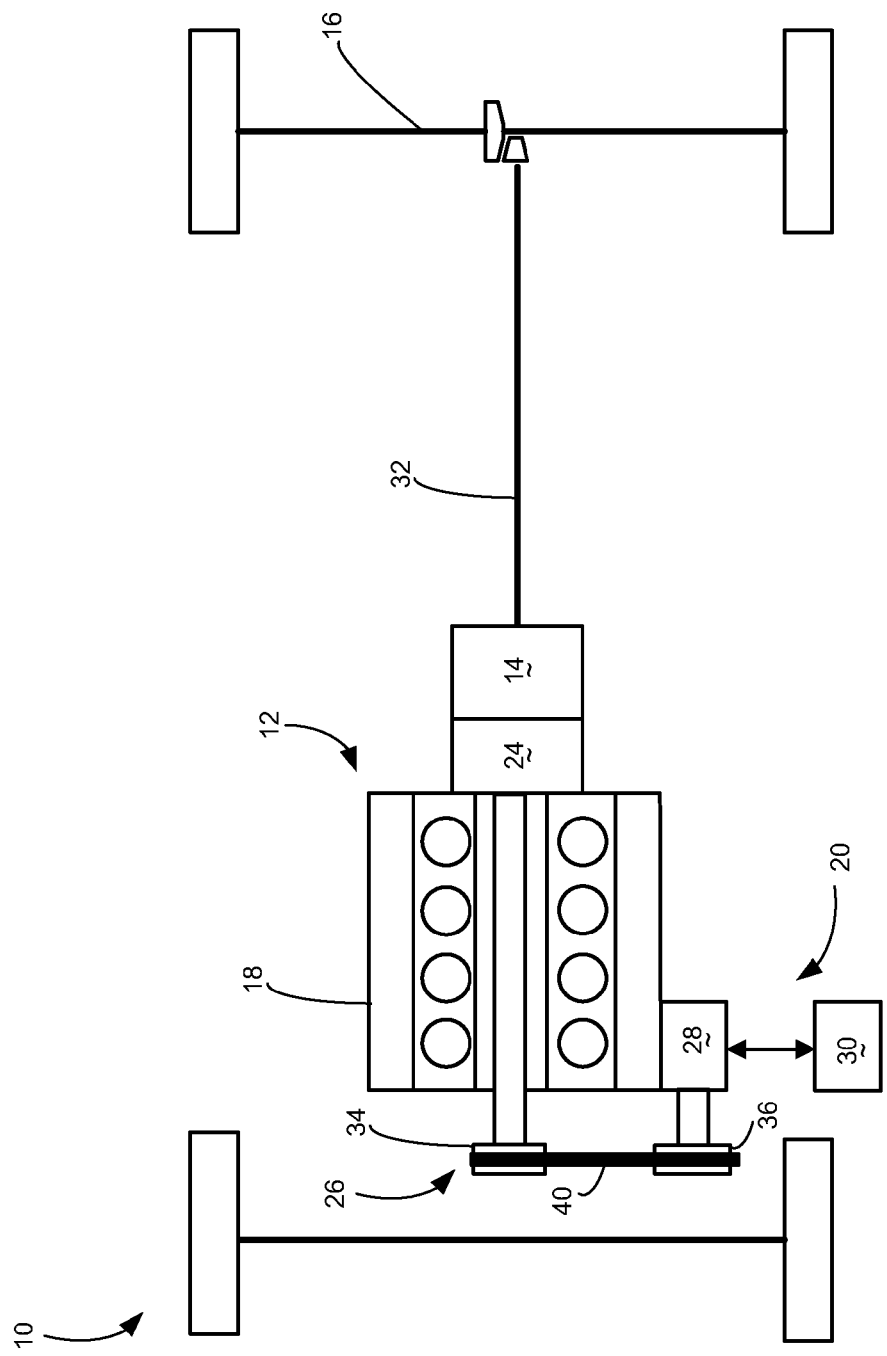
FIG. 1 is a schematic illustration of a vehicle according to the present disclosure.

Referring now to FIG. 1, an exemplary hybrid vehicle 10 is schematically illustrated. Vehicle 10 may include an engine assembly 12, a transmission 14, and a drive axle 16. The engine assembly 12 may include an internal combustion engine 18 and a hybrid power assembly 20. The internal combustion engine 18 may include a crankshaft 22 coupled to the transmission 14 via a coupling device 24 and to the hybrid power assembly 20 via an accessory drive system 26. The crankshaft 22 may form a first rotational drive member. By way of non-limiting example, the coupling device 24 may include a friction clutch or a torque converter.

The hybrid power assembly 20 may include an electric motor 28 and a rechargeable battery 30. The motor 28 may form a second rotational drive member. The motor 28 may be in electrical communication with the battery 30 to convert power from the battery 30 to mechanical power. The motor 28 may additionally be operated as a generator to provide power to charge the battery 30, as discussed below. The engine 18 and motor 28 may be coupled via the accessory drive system 26.

The transmission 14 may use the power provided from engine 18 and/or the motor 28 to drive an output shaft 32 and power rotation of the drive axle 16. Alternatively, rotation of the drive axle 16 may be used to power rotation of the crankshaft 22 and to drive the motor 28 for recharging the battery 30.

With additional reference to FIGS. 2-5, the accessory drive system 26 may include first, second, and third drive hubs 34, 36, 38, a belt 40, and a tensioner assembly 42. First, second, and third drive hubs 34, 36, 38 may each be fixed for rotation with an engine component. By way of non-limiting example, the first drive hub 34 may be fixed for rotation with the crankshaft 22, the second drive hub 36 may be fixed for rotation with the motor 28, and the third drive hub 38 may be fixed for rotation with an additional component (not shown), such as an air conditioner compressor, driven by the crankshaft 22 and/or the motor 28. The belt 40 may be engaged with the first, second, and third drive hubs 34, 36, 38 to drive the second and third drive hubs 36, 38 by rotation of the first drive hub 34 or the first and third drive hubs 34, 38 by rotation of the second drive hub 36. The belt 40 may be additionally engaged with the tensioner assembly 42 to maintain belt tension during operation.

The tensioner assembly 42 may include a bracket assembly 44, a tensioner arm 46, first and second tensioner hubs 48, 50, a hydraulic strut tensioner 52, and a fastener 54. The bracket assembly 44 may include first and second brackets 56, 58. The pivot region 64 may be located between first and second ends of the first bracket 56 and may include an aperture 66 housing a first bearing 68 therein. The first bearing 68 may be located axially inward from a first axial side 70 of the first bracket 56 and may extend axially outward from a second axial side 72 of the first bracket 56 opposite the first axial side 70.

The second bracket 58 may include a bearing housing 74 supporting a second bearing 76 therein and first and second legs 78, 80 extending therefrom. The first and second legs 78, 80 may fix the second bracket 58 relative to the first bracket 56. More specifically, and by way of non-limiting example, the first and second legs 78, 80 may include apertures (not shown) receiving fasteners 86, 88. Fasteners 86, 88 may be engaged with the first bracket 56 fixing the second bracket 58 to the first bracket 56. However, it is understood that the first and second brackets 56, 58 may alternatively be formed as a single member. The bearing housing 74 and the second bearing 76 may be spaced axially outward, or offset, from the first axial side 70 of the first bracket 56 by the first and second legs 78, 80. The bearing housing 74 and the second bearing 76 may be axially spaced from the first axial side 70 a distance (A1) greater than an axial extent (A2) of the first tensioner hub 48.

The tensioner arm 46 may be rotationally coupled at a first end to the first bracket 56 and the first tensioner hub 48 may be coupled to a second end of the tensioner arm 46. The hydraulic strut tensioner 52 may have a first end coupled to the first bracket 56 and a second end coupled to the engine 18. The second tensioner hub 50 may be coupled to the first bracket 56. The fastener 54 may extend through the first and second bearings 68, 76 to rotationally couple the first bracket 56 to an engine structure. The fastener 54 may define a rotational axis for the tensioner assembly 42.

As discussed above, the belt 40 may be engaged with the tensioner assembly 42. More specifically, the belt 40 may be engaged with the first and second tensioner hubs 48, 50. The first and second bearings 68, 76 may be axially spaced from one another and the first tensioner hub 48 may be located centrally between the first and second bearings 68, 76. The first bearing 68 may be located a distance (A3) and the second bearing 76 may be located a distance (A4) from a centerline (A5) of the belt 40 engaged with the first and second tensioner hubs 48, 50. The centerline (A5) may also define a centerline for the first tensioner hub 48. By way of non-limiting example, the first and second bearings 68, 76 may be equidistant from the centerline (A5) of the belt 40 (A3=A4) to balance the belt load.

The spacing between the first and second bearings 68, 76 may provide a greater range of travel for the tensioner arm 46 and the first tensioner hub 48. Specifically, the region between the first and second bearings 68, 76 may have a radial extent (R1) that is less than the radial extent (R2) of the first and second bearings 68, 76. By way of non-limiting example, the radial extent (R1) may be defined by the fastener 54.

Figure 2:
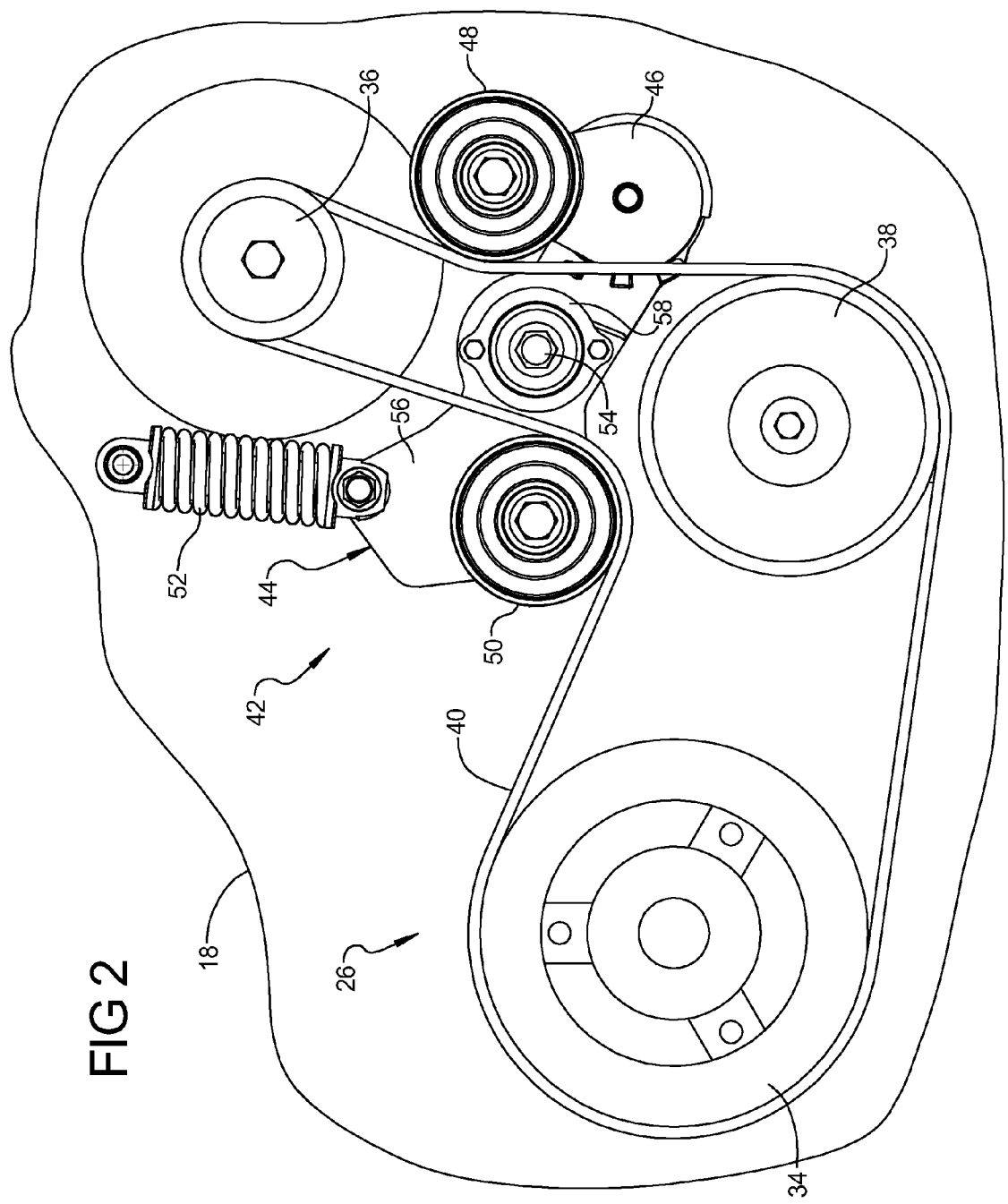
FIG. 2 is a fragmentary plan view of the engine assembly of the vehicle in FIG. 1 illustrating the tensioner assembly in a first position.
Figure 3:
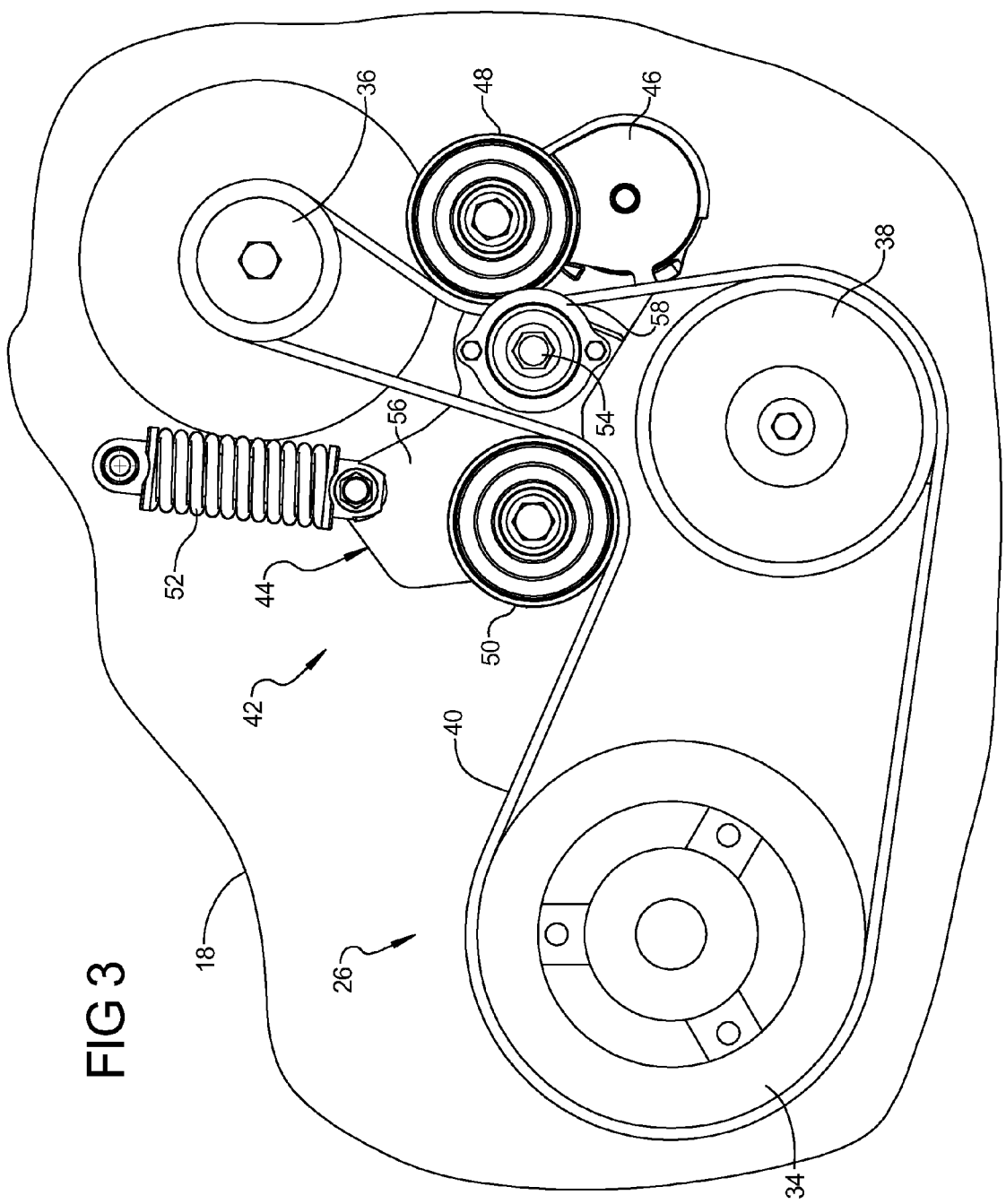
FIG. 3 is a fragmentary plan view of the engine assembly of the vehicle in FIG. 1 illustrating the tensioner assembly in a second position.
Figure 4:
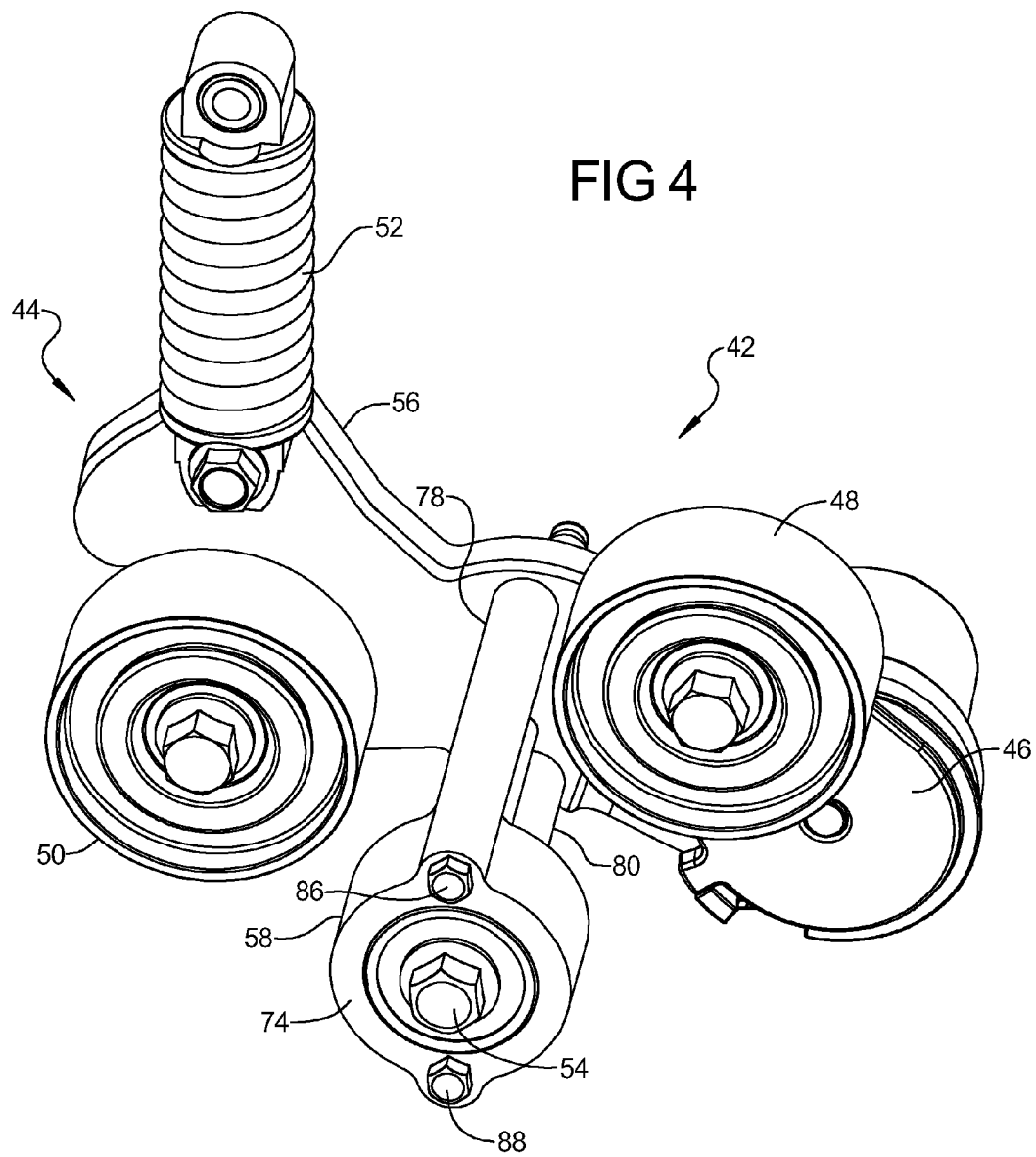
FIG. 4 is a perspective view of the tensioner assembly in FIG. 2.
Figure 5:
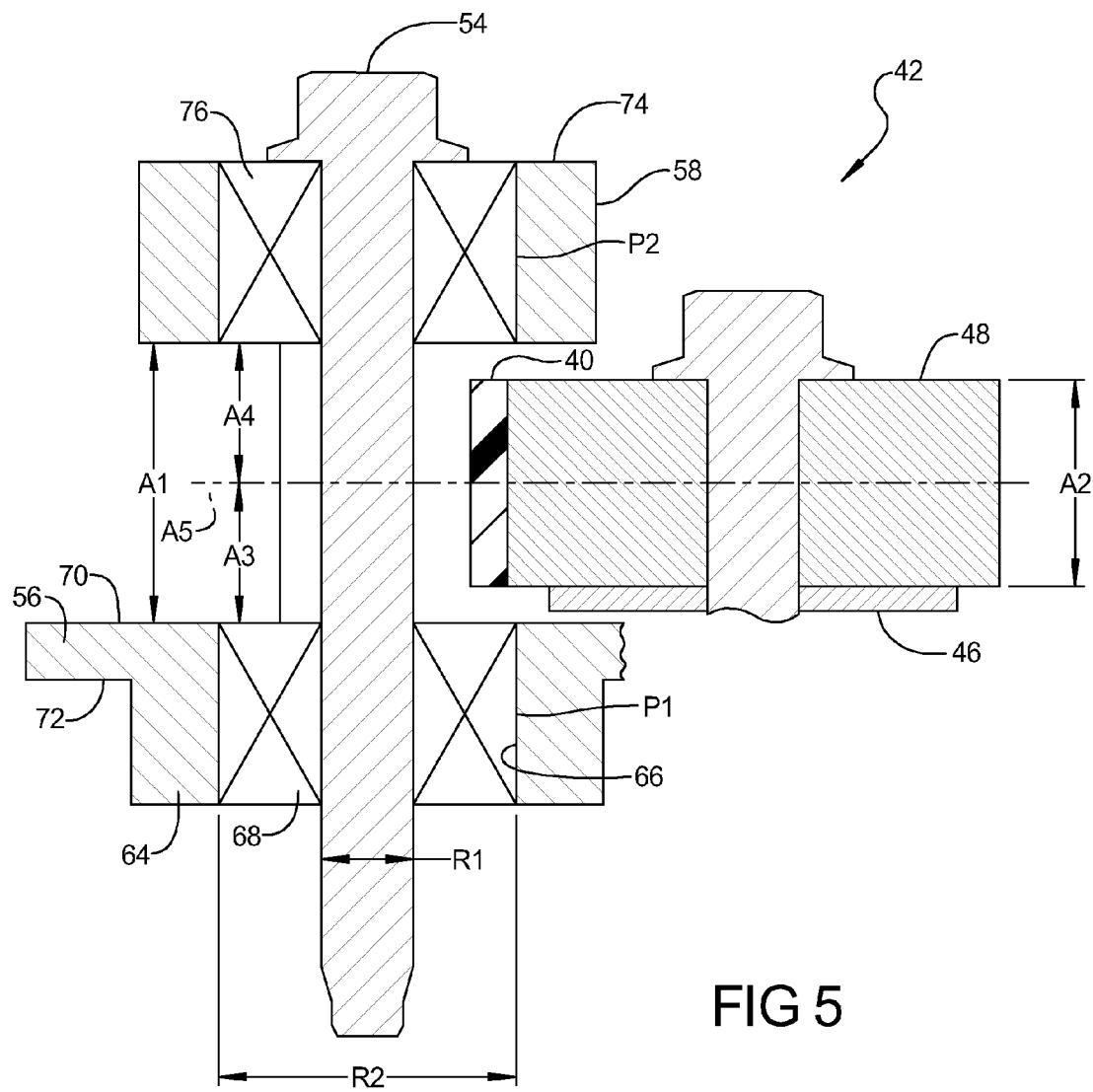
FIG. 5 is a schematic fragmentary section view of the tensioner assembly in FIG. 4.

In the first position, seen in FIG. 2, the first tensioner hub 48 and belt 40 may be located radially outward from outer perimeters (P1, P2), shown in FIG. 5, of the first and second bearings 68, 76. In the second position, seen in FIGS. 3 and 5, the tensioner arm 46 may be rotated counterclockwise relative to the first position and the first tensioner hub 48 and belt 40 may be located radially within the outer perimeters (P1, P2) of the first and second bearings 68, 76. The tensioner arm 46 may normally be biased toward the second position by a biasing member such as a spring (not shown).

During operation of the vehicle 10, the engine assembly 12 may be switched between first and second modes. The first mode may include the engine powering rotation of the crankshaft 22 and the first drive hub 34. The second mode may include the motor 28 powering rotation of the second drive hub 36 and driving rotation of the crankshaft 22 via the belt engagement between first and second drive hubs 34, 36. The greater range of motion afforded by the location of the first and second bearings 68, 76 may maintain tension in the belt 40 during operation in the first and second modes as well as the transitions between the first and second modes.

What is claimed is:

1. An accessory drive tensioner assembly comprising:
   a bracket assembly including first and second bearings axially spaced from one another;
   a fastener extending through the first and second bearings to rotationally couple the bracket assembly to an engine structure and defining a rotational axis for the bracket assembly; and
   a tensioner hub coupled to the bracket assembly and located axially between the first and second bearings.

2. The accessory drive tensioner assembly of claim 1, wherein the first bearing is offset axially outward from a first axial end of the tensioner hub and the second bearing is offset axially outward from a second axial end of the tensioner hub opposite the first axial end.

3. The accessory drive tensioner assembly of claim 1, wherein the tensioner hub is located centrally between the first and second bearings.

4. The accessory drive tensioner assembly of claim 1, wherein the bracket assembly includes a first bracket housing the first bearing, a second bracket fixed to the first bracket and housing the second bearing, and a tensioner arm having a first end rotationally coupled to the first bracket and a second end having the tensioner hub coupled thereto.

5. The accessory drive tensioner assembly of claim 4, wherein the tensioner arm is adapted to locate a drive belt engaged with the tensioner hub radially within an outer perimeter of the first bearing when the tensioner arm is displaced from a first position to a second position.

6. The accessory drive tensioner assembly of claim 5, wherein an outer perimeter of the tensioner hub is located radially within the outer perimeter of the first bearing when in the tensioner arm is in the second position.

7. The accessory drive tensioner assembly of claim 4, wherein the first bracket includes a first axial side and the first bearing is located axially inward from the first axial side.

8. The accessory drive tensioner assembly of claim 7, wherein the second bearing is axially spaced from the first axial side.

9. An accessory drive tensioner assembly comprising:
   a bracket assembly including first and second bearings axially spaced from one another;
   a fastener extending through the first and second bearings to rotationally couple the bracket assembly to an engine structure and defining a rotational axis for the bracket assembly;

a tensioner arm having a first end rotationally coupled to the bracket assembly; and a tensioner hub coupled to a second end of the tensioner arm and located axially between the first and second bearings, the tensioner arm being adapted to locate a drive belt engaged with the tensioner hub radially within an outer perimeter of the first bearing when the tensioner arm is displaced from a first position to a second position.

10. The accessory drive tensioner assembly of claim 9, wherein the tensioner hub is located centrally between the first and second bearings.

11. An engine assembly comprising:

an engine structure;

a first rotational drive member having a first drive hub rotationally fixed thereto;

a second rotational drive member having a second drive hub rotationally fixed thereto;

a tensioner assembly including:

a bracket assembly including first and second bearings axially spaced from one another;

a fastener extending through the first and second bearings and rotationally coupling the bracket assembly to the engine structure; and a tensioner hub coupled to the bracket assembly and located axially between the first and second bearings; and a drive belt engaged with the first and second drive hubs and the tensioner hub to transfer rotation between the first and second rotational drive members.

12. The engine assembly of claim 11, wherein the first bearing is offset axially outward from a first axial end of the tensioner hub and the second bearing is offset axially outward from a second axial end of the tensioner hub opposite the first axial end.

13. The engine assembly of claim 11, wherein the first rotational drive member includes a crankshaft and the second rotational drive member includes an electric motor forming a hybrid engine assembly.

14. The engine assembly of claim 11, wherein the bracket assembly includes a first bracket housing the first bearing, a second bracket fixed to the first bracket and housing the second bearing, and a tensioner arm having a first end rotationally coupled to the first bracket and a second end having the tensioner hub coupled thereto.

15. The engine assembly of claim 14, wherein the tensioner arm is displaceable between first and second positions, the belt being located radially outward from an outer perimeter of the first bearing when in the first position and being located radially within the outer perimeter of the first bearing when in the second position.

16. The engine assembly of claim 15, wherein an outer perimeter of the tensioner hub is located radially within the outer perimeter of the first bearing when in the tensioner arm is in the second position.

17. The engine assembly of claim 14, wherein the first bracket includes a first axial side and the first bearing is located axially inward from the first axial side.

18. The engine assembly of claim 17, wherein the second bearing is axially offset from the first axial side.

19. The engine assembly of claim 11, wherein the belt defines a centerline and the first and second bearings are spaced equidistant from the centerline.

20. The engine assembly of claim 11, further comprising a tensioner arm having a first end rotationally coupled to the bracket assembly and being displaceable between first and second positions, the tensioner hub coupled to a second end of the tensioner arm and locating the belt radially outward from an outer perimeter of the first bearing when the tensioner arm is in the first position and locating the belt radially within the outer perimeter of the first bearing when the tensioner arm is in the second position.

* * * * *